(12) United States Patent
Schöning et al.

(10) Patent No.: US 9,286,353 B2
(45) Date of Patent: Mar. 15, 2016

(54) METHOD FOR GENERATING PROCESSING SPECIFICATIONS FOR A STREAM OF DATA ITEMS

(75) Inventors: Harald Schöning, Dieburg (DE); Udo Hafermann, Darmstadt (DE)

(73) Assignee: SOFTWARE AG, Darmstadt (DE)

( * ) Notice: Subject to any disclaimer, the term of this patent is extended or adjusted under 35 U.S.C. 154(b) by 1376 days.

(21) Appl. No.: 12/591,951

(22) Filed: Dec. 4, 2009

(65) Prior Publication Data

US 2011/0125762 A1 May 26, 2011

(30) Foreign Application Priority Data

Nov. 24, 2009 (EP) ..................................... 09176936

(51) Int. Cl.
*G06F 17/30* (2006.01)
(52) U.S. Cl.
CPC ................................ *G06F 17/30516* (2013.01)
(58) Field of Classification Search
USPC ........................... 707/687, 783, 784; 340/541
See application file for complete search history.

(56) References Cited

U.S. PATENT DOCUMENTS

| | | | |
|---|---|---|---|
| 5,734,888 A * | 3/1998 | Li et al. | 1/1 |
| 6,504,479 B1 * | 1/2003 | Lemons et al. | 340/541 |
| 2007/0260569 A1 | 11/2007 | Biger et al. | |
| 2007/0291117 A1 | 12/2007 | Velipasalar et al. | |
| 2010/0023300 A1 * | 1/2010 | Farry et al. | 702/181 |

OTHER PUBLICATIONS

"Mining Security Events in a Distributed Agent Society", Dasgupta et al., Proc. SPIE Information Assurance and Security, vol. 6241, Apr. 17, 2006.
"An Effective XML-Based Sensor Data Stream Processing Middleware for Ubiquitous Service", Lee et al., Computational Science and Its Applications, Aug. 26, 2007, pp. 844-857.
"XQuery 1.1 Use Cases", Dec. 3, 2008, cases XP002574880 Retrieved from the Internet: www.w3.org/TR/xquery-11-use-cases XP002574880.

* cited by examiner

*Primary Examiner* — Md. I Uddin
(74) *Attorney, Agent, or Firm* — Nixon & Vanderhye P.C.

(57) ABSTRACT

At least one processing specification is generated for a stream of data items captured by a sensor. A plurality of proposed window specifications is generated. The at least one processing specification is generated based on at least one of the proposed window specifications. The plurality of proposed window specifications being generated based on a similarity metric is configured to identify similar pairs of data items in the stream of data items.

19 Claims, 5 Drawing Sheets

Fig. 1 (Prior Art)

```
sliding window $w in $seq/stream/event
    start     $s when $s/direction eq "in"
    only end  $e when $s/person eq $e/person and
                     $e/direction eq "out"
```

☒ windows can overlap
○ window based on time interval: [1 ▼] [hour ▼]

○ window based count: [2 ▼]

◉ "X in" to "X out":

○ "X in" to "X in":

○ other

Fig. 5

```
declare namespace stream_inputstream_0 =
  "http://securitystream.mycompany.com/";
declare variable $STREAM_InputStream_0 external;
for sliding window $SAMEVALUEWINDOW_0 in $STREAM_InputStream_0
  start $SAMEVALUEWINDOW_0_start when
    $SAMEVALUEWINDOW_0_start/
    self::stream_inputstream_0:securityRecord/direction eq "in"
  only end $SAMEVALUEWINDOW_0_end when
    $SAMEVALUEWINDOW_0_end/
    self::stream_inputstream_0:securityRecord/direction eq "out"
    and $SAMEVALUEWINDOW_0_end/self::stream_inputstream_0:
      securityRecord/name eq
      $SAMEVALUEWINDOW_0_start/self::stream_inputstream_0:
      securityRecord/name
return
```
⎱ 30

Fig. 6

METHOD FOR GENERATING PROCESSING SPECIFICATIONS FOR A STREAM OF DATA ITEMS

This application claims priority to European Application No. 09176936.4, filed, 24 Nov. 2009, the entire contents of which is hereby incorporated by reference.

1. TECHNICAL FIELD

The present invention relates to a method for generating processing specifications for a stream of data items.

2. THE PRIOR ART

Modern computer systems oftentimes operate on streaming data, i.e. on a consecutive sequence of data items captured by a sensor, wherein the already received data items are processed while further data items are still captured by the sensor. Typical application scenarios are security systems, such as facility surveillance systems, where streams of data items captured by a card reader are processed in order to identify unauthorized access to confidential areas within the facility or other abnormal behavior of the people entering and leaving a building.

In order to process such, theoretically infinite, streams of data items (also referred to as events), it is known to divide the stream of events into finite processable portions, known as windows, and to apply computations on the windows in order to perhaps generate a further, possibly infinite, event stream resulting from the concatenation of the computation results. A window specification typically comprises a start condition and an end condition, so that windows (i.e. concrete subsequences of events in a given stream) each comprise all consecutive events between a start event matching the start condition and an end event matching the end condition.

While the detection of abnormal behavior relating to one single data item/event is rather straight-forward (e.g. determining that a person's ID card has expired when the card is read by the card reader), most real-life scenarios require the detection of more complex situations that relate to multiple data items within the stream (e.g. that a person entered a certain room, but did not leave the room after a predetermined amount of time). This processing paradigm is generally known as complex event processing.

One critical and difficult task in complex event processing is to define adequate criteria for dividing the input stream into windows in a reasonable manner in order to detect the desired abnormal conditions. If, for example, the stream of data items captured by a card reader (which represents people entering and leaving a building) would be divided falsely (e.g. if the 'enter' event and the 'leave' event are divided among different windows), the processing of the individual resulting windows would make it hard or even impossible to reveal the fact that a person has been in a certain room for too long. It is therefore critical to provide window specifications that allow for processing the individual data items in the correct manner.

The definition of such windows is typically part of the processing specification which typically follows the 'continuous query' approach, i.e. the query processing of the data items runs forever on the given input streams. Computer languages adapted for describing such processing specifications typically provide complex syntactical notations to define windows, e.g. as an extension to SQL or as specified in the XQuery 1.1 proposal. For example, windows can be simply based on counts (e.g. each window contains three adjacent events), on timing (e.g. all events that happened within one hour) or based on event correlation (e.g. windows cover periods while a person is in a building, i.e. all events between the event 'Person enters building' and 'Person leaves building'). Furthermore, windows may be overlapping (so-called sliding windows) or non-overlapping (so-called tumbling windows).

Figure 1:
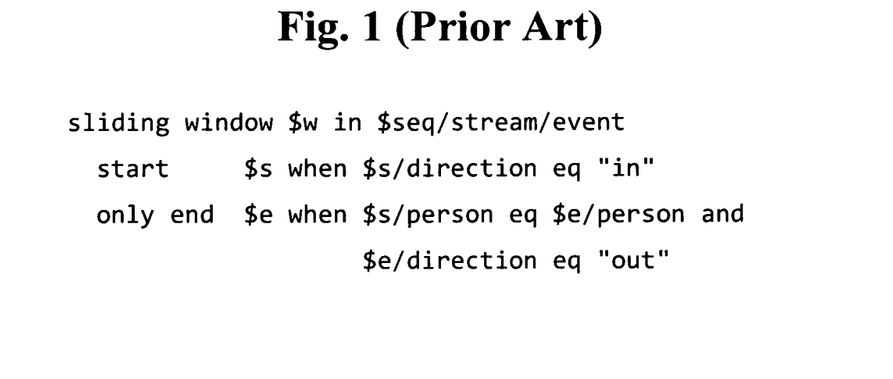
FIG. 1: An exemplary processing specification in XQuery according to the prior art.

FIG. 1 shows a simple example of a window specification in XQuery. As can be seen, the window specification comprises a start and an end condition that determine where to divide the stream of data items (events). Looking more in detail at the start condition in this example, a new window begins each time a 'direction' attribute of a data item has the value 'in' (e.g. each time a person enters a building). The end condition determines when the respective window ends, namely whenever the 'direction' attribute of a consecutive data item has the value 'out' and the value of a 'person' attribute of the consecutive data item is equal to the value of the 'person' attribute of the data item involved in the start condition (e.g. whenever the same person leaves the building).

While window definitions according to the above syntactical notation are very powerful and flexible, they can become very complex and difficult for a query designer to define, both on a syntactical level (i.e. how to formulate a processing specification correctly in a particular language) and on a semantical level (i.e. how to ensure that the formulated processing specification represents a window definition that divides the stream of data items in a reasonable manner). As a consequence, manually defined processing specifications very likely are prone to errors and may thus result in severe security holes in the underlying processing logic.

In the prior art, a number of approaches are known that have the intention to help the query designer in defining window specifications. For example, the US 2009/0106701 concerns an interactive complex event pattern builder and visualizer which involves a graphical user interface in order to help the developer in defining syntactically correct event-condition-action rules. The 2005/0222996 and the 2006/0224542 focus on the evaluation and management of event-condition-action rules in database systems. Furthermore, systems and methods for situation monitoring and event processing are disclosed e.g. in the U.S. Pat. No. 7,499,900, the U.S. Pat. No. 7,468,662, the U.S. Pat. No. 6,496,831, the U.S. Pat. No. 6,601,193 and the US 2008/0120283 that operate on manually predefined rule sets. Further background information about complex event processing may be found e.g. in the U.S. Pat. No. 6,681,230, the U.S. Pat. No. 6,502,133, the U.S. Pat. No. 6,449,618, the US 2006/0229923, the US 2009/0006320, the US 2009/0171999, the U.S. Pat. No. 7,275,250, the U.S. Pat. No. 7,398,530, the U.S. Pat. No. 7,444,395 and the U.S. Pat. No. 7,502,845.

However, all known systems and methods either require already manually predefined rule sets or merely assist the developer in defining syntactically correct rules in a given stream processing language. Therefore all known systems fall short of helping the developer in deciding how to divide (on a semantical level) a given stream of data items in a correct and accurate manner in order to allow for a reliable detection of complex events within the stream.

It is therefore the technical problem underlying the present invention to provide a method for generating more accurate processing specifications for streams of data items, thereby increasing the security and reliability of the underlying computer systems and at least partly overcoming the above explained disadvantages of the prior art.

3. SUMMARY OF THE INVENTION

This problem is according to one aspect of the invention solved by a method for generating at least one processing specification for a stream of data items captured by a sensor. In the embodiment of claim 1, the method comprises the steps of:

a. generating a plurality of proposed window specifications and generating the at least one processing specification based on at least one of the proposed window specifications;

b. wherein the plurality of proposed window specifications is generated based on a similarity metric adapted for identifying similar pairs of data items in the stream of data items.

Accordingly, instead of manually defining a processing specification for a given stream of data items, the embodiment defines a method that proposes a plurality of window specifications for a given stream of data items. The plurality of proposed window specifications are derived from the input stream of data items based on a similarity metric. The stream of data items is captured by a sensor, such as a hardware sensor (e.g. a card reader or a temperature sensor) or a software sensor (e.g. a computer program, service or other application that outputs streams of events). The at least one processing specification, which may comprise processing instructions in a stream processing language such as XQuery, is then generated based on at least one of the proposed window specifications.

Since the plurality of proposed window specifications are generated based on a similarity metric that is adapted for identifying similar pairs of data items in the stream of data items, the identified similar pairs of data items can be used for defining a start and an end condition of the respective proposed window specification. As a result, the obtained proposed window specifications are more accurate as compared to the prior art, since the method of the present invention, preferably automatically, detects similar data items, i.e. patterns of related data items, within the stream.

In another aspect of the present invention, the similarity metric may be adapted for calculating a pair-wise similarity value of at least one pair of data items in the stream of data items, as will be further explained in the detailed description below. Furthermore, the method may comprise the further step of calculating an accumulated similarity value for the plurality of proposed window specifications and generating the at least one processing specification based on the proposed window specification with the highest accumulated similarity values.

In yet another aspect of the present invention, the method may comprise the further steps of displaying the plurality of proposed window specifications to a user, selecting at least one of the proposed window specifications by the user and generating the at least one processing specification based on the at least one selected proposed window specification. Accordingly, the process of generating a processing specification may be interactive, i.e. the user is presented with a plurality of proposed window specifications and may then select the most appropriate window specification according to the user's requirements. The automatic proposing of likely relevant window specification improves the accuracy of the generated processing specifications to a great extent.

In a further aspect, the method may comprise the steps of selecting a first data item in the stream and identifying a second data item in the stream based on the similarity metric. Accordingly, in case the user is not satisfied with the proposed window specifications, a first data item in the stream may be selected, preferably by the user, and the method may identify a second data item based on the similarity metric. Based on the new set of first and second data item, the method may then generate further proposed window specification(s). Preferably, the window specifications that were already proposed are excluded in this stage. This aspect of the present invention further improves the accuracy of the obtained processing specifications, since the user may fine-tune the proposed window specifications.

Additionally, the method may comprise the further steps of selecting a third data item in the stream that is different from the identified second data item and generating a proposed window specification based on the pair of data items formed by the selected first and third data items. Accordingly, also the second data item may be edited, preferably be the user, by selecting a third data item in the stream, so that the method generated one or more proposed window specifications based on the selected first and third data item, in order to further fine-tune the proposed window specification(s) as will be explained in the detailed description below.

In another aspect, the data items may comprise at least one attribute and wherein the similarity metric may be adapted for calculating a pair-wise similarity value based on values of the at least one attribute in the at least one pair of data items. Furthermore, the pair-wise similarity value may be increased, if the values of the at least one attribute in the at least one pair of data items are equal. Additionally or alternatively, the pair-wise similarity value may be increased, if the at least one attribute is a binary attribute and if the values of the at least one binary attribute in the at least one pair of data items are complementary. A binary attribute may in this context be understood as an attribute with two possible values (e.g. a 'direction' attribute with the possible values 'in' and out'). Further examples are explained in the detailed description below.

Furthermore, the similarity metric may operate on metadata about the data items. Preferably, the metadata is obtained from an ontology, as will be further explained in the detailed description below.

In yet another aspect of the present invention, the method may comprise the further steps of receiving at least one processing specification, deriving at least one stream of data items based on the at least one processing specification and/or displaying at least one proposed window specification in the stream of data items. Accordingly, the method may be used for visualizing a given processing specification, e.g. an XQuery window definition, as will be further explained in the detailed description below. It will be appreciated that this aspect of the present invention may be implemented in connection or independently of the further aspects described herein.

The present invention also concerns a computer program comprising instructions adapted for implementing any of the above methods. Such a computer program may be stored on any suitable computer readable storage medium and may be executed by any suitably configured computer system including, for example, a processor and memory.

Furthermore, the invention is directed to a system for generating at least one processing specification for a stream of data items captured by a sensor, wherein the system comprises a window specification generator adapted for generating a plurality of proposed window specifications and a processing specification generator adapted for generating the at least one processing specification based on at least one of the proposed window specifications, wherein the window specification generator is adapted for generating the plurality of proposed window specifications based on a similarity metric adapted for identifying similar pairs of data items in the stream of data items.

Moreover, the window specification generator may be further adapted for calculating an accumulated similarity value for the plurality of proposed window specifications and the processing specification generator may be further adapted for generating the at least one processing specification based on the proposed window specifications with the highest accumulated similarity values.

In yet another aspect, the system may further comprise a graphical user interface adapted for displaying the plurality of proposed window specifications to a user and for allowing the user to select at least one of the proposed window specifications, wherein the processing specification generator is adapted for generating the at least one processing specification based on the at least one selected proposed window specification.

4. SHORT DESCRIPTION OF THE DRAWINGS

In the following detailed description, presently preferred embodiments of the invention are further described with reference to the following figures.

5. DETAILED DESCRIPTION

Figure 3:
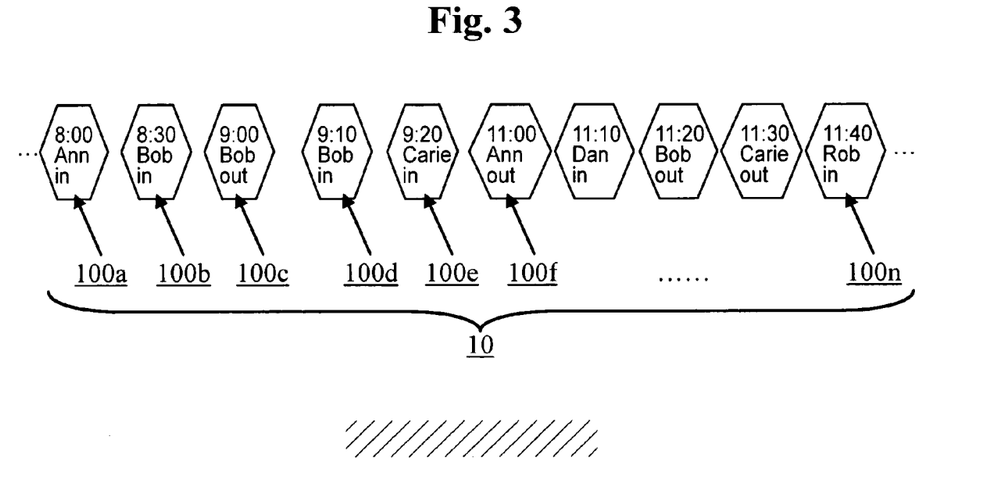
FIG. 3: An exemplary stream of data items in accordance with an embodiment of the present invention.

In the following, a presently preferred embodiment of the invention is described with respect to an exemplary excerpt of a stream 10 of data items (events) 100a, ..., 100n as schematically shown in FIG. 3. As can be seen, each of the data items 100a, ..., 100n comprises a timestamp, an attribute 'person' (with the values 'Ann', 'Bob', 'Carie', 'Dan' and 'Rob', respectively) and an attribute 'direction' (with the values 'in' and 'out', respectively). It will be appreciated that FIG. 3 shows an extremely simplified example and that streams may comprise any type of data items with any number and amount of attributes. Generally, a stream 10 may be understood as an ordered sequence of consecutive data items (events).

Figure 2:
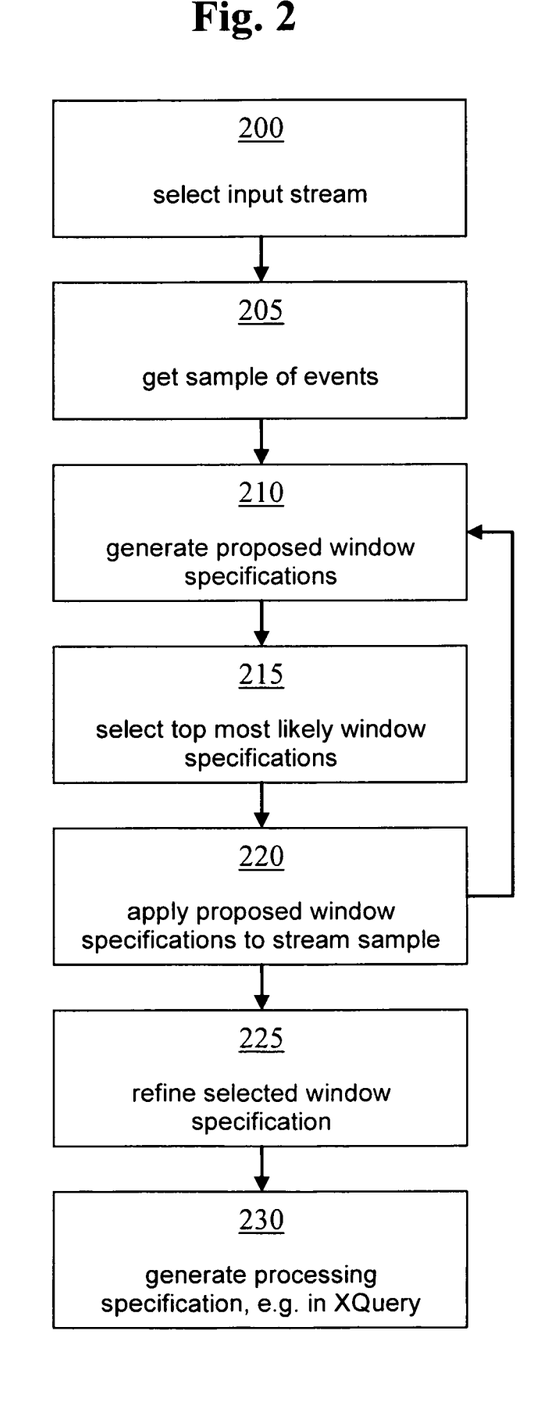
FIG. 2: A flowchart of processing steps performed by a method in accordance with an embodiment of the present invention.

FIG. 2 shows a flowchart with processing steps performed by a method according to an embodiment of the present invention. It will be appreciated that some of the processing steps described in the following may be omitted or performed in a different order in other embodiments.

As can be seen in FIG. 2, a user may select an event stream 10 in step 200, e.g. from a given set of streams (e.g. registered/stored in a registry) or by specifying an appropriate sensor 5 (see below).

In step 205, a sufficiently large sample of events (data items) is obtained from the event stream 10 (cf. FIG. 3). While a sample of a stream is to be understood as an excerpt, i.e. a sub-sequence of the (possibly infinite sequence) of data items of the stream, the terms 'sample stream' and 'stream' may be used interchangeably in the following. Whether a sample is sufficiently large may be verified with the user, e.g. by displaying a stream sample in a graphical user interface 60 (see below) to the user and asking him whether this sample is sufficient. If the answer is 'no', the sample may be extended (i.e. a sample with more data items may be obtained from the stream) until the user is satisfied.

Figure 4:
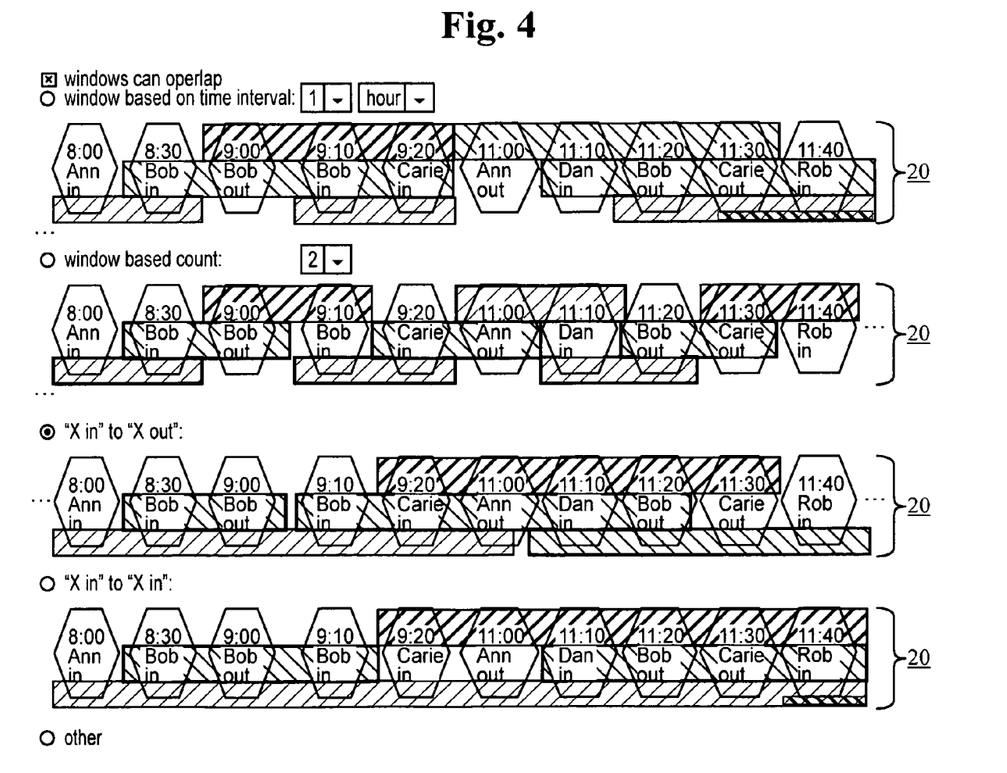
FIG. 4: Exemplary proposed window specifications in accordance with an embodiment of the present invention.

In step 210, a plurality of proposed window specifications 20 is generated (e.g. by a window specification generator 40; see below) based on the stream 10 (i.e. on the stream sample obtained in step 205). More specifically, likely window definitions 20 are algorithmically derived from the stream 10 based on at least one of the following heuristics and metrics (or even a combination thereof):

Similarity metrics (see further below) may be applied to pairs of events 100a, ..., 100n and the results may be combined to derive a certain amount (e.g. 2 to 3) likely window specifications 20 on the basis of event correlation (cf. the lower two window specifications 20 shown in FIG. 4 and explained in more detail below). For example, if the sum of pair-wise similarities according to a first event attribute is significantly higher than the sum of pair-wise similarities according to a second event attribute, window definitions 20 based on the first similarity (relating to the first event attribute) are more likely.

The window definition may be based on the count of events 100a, ..., 100n (e.g. each window may have the same size, such as three consecutive events). In this case, the window definitions 20 may be based on a heuristic, e.g. based on the size of the sample 10 (e.g. sample size/100).

The window definition may be time based. Besides fixed time intervals, e.g. 5 minutes, the temporal distribution within the stream 10 may give further hints, e.g. if events 100a, ..., 100n occur only during working hours, a working day would be a reasonable window size.

Lastly, the window definition may be based on event homogeneity. If multiple subsequent events 100a, ..., 100n are very similar (e.g. a series of temperature measurements, wherein the individual data items are almost constant for a certain period and then the stream shows a peak, i.e. an exceptionally high measurement value), the window definition may be based on changes in this similarity. In this case, measures such as standard deviation or other statistical functions may be applied (cf. e.g. the compendium of metrics in the context of computational linguistics and string processing at http://www.dcs.shef.ac.uk/~sam/stringmetrics.html). The application of string-based algorithms may be directly based on string-valued attributes, or may be based on sequences of attribute values by treating them as sequences of symbols corresponding to strings of letters.

In step 215, a likelihood value may be assigned to each proposed window specification 20 derived in step 210, e.g. by accumulating the individual pair-wise similarity values of the pairs of data items identified within the stream 10. Based on the assigned likelihood value, the top most likely proposed window specifications 20 may be selected.

In step 220, the generated proposed window specifications 20 may be applied one-by-one to the stream 10 and the result may be graphically displayed to the user (cf. the two lower proposed window specifications in FIG. 4) in order to let the user choose the most accurate proposed window specification 20. As can be seen, the proposed window specification 20 shown in the third row of FIG. 4 divides the stream 10 according to the condition 'X in' to 'X out' (note the windows depicted by bold rectangles that span the events 'Ann in' ... 'Ann out', 'Bob in' ... 'Bob out' (two times), 'Carie in' ... 'Carie out' and 'Dan in' ..., wherein there is no closing event corresponding to 'Dan in'). Similarly, the proposed window specification 20 shown in the last row of FIG. 4 divides the stream 10 according to the condition 'X in' to 'X in'. Moreover, the user may be provided with a choice to base the window definition on time or count instead (cf. the two upper proposed window specifications in FIG. 4). If the user does not find a window definition 20 that matches his requirements, the method may perform an interactive fine-tuning loop (cf. the arrow pointing from step 220 back to step 210 in FIG. 2), e.g. as follows:

The user may select a sample start event (i.e. a first data item 100a, . . . , 100n) in the stream 10. Based on similarity metrics and/or statistical methods, a likely end event (i.e. a second data item 100a, . . . , 100n) may be detected (preferably, those events that were used to propose window specifications 20 in step 210 are excluded) and the detected end event may be presented to the user.

The user may acknowledge the end event or select another end event (i.e. a third data item 100a, . . . , 100n) from the stream 10. In the latter case, the similarity of the selected start and end events may be computed and, based on the resulting similarity value, at least one further proposed window specification 20 in the stream 10 may be generated and presented to the user. The user may then acknowledge or correct the new proposed window specification 20. In the latter case, the similarity may be calculated for the new window(s) and the result may be used to perform a further fine-tuning loop (this process may be repeated as often as the user desires).

In step 225, the user may refine the proposed window definitions 20 found so far by e.g. editing the window definition in text form. Preferably, step 225 is performed after step 230 (see below), and the user may refine the proposed window definitions 20 by editing the generated proposed window specification 20.

Figure 5:
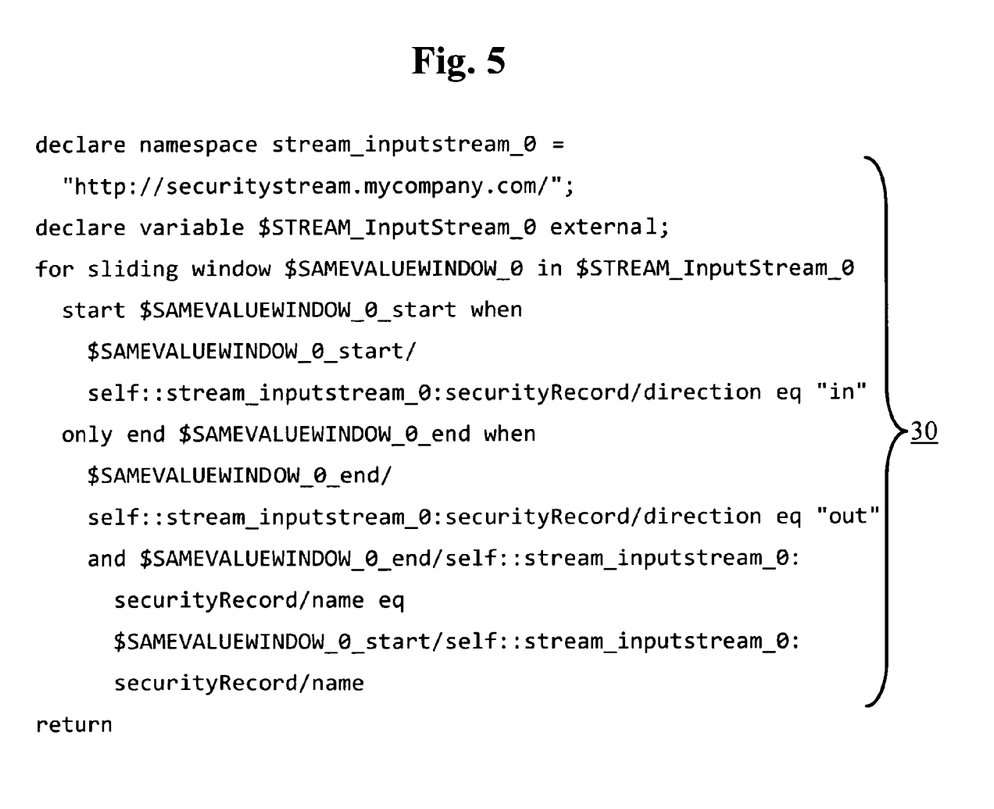
FIG. 5: An exemplary processing specification in accordance with an embodiment of the present invention.

Once the user acknowledges a proposed window definition 20, the method proceeds to step 230 and a corresponding syntax 30, e.g. in XQuery or another suitable stream processing language, is generated based on the acknowledged proposed window specification 20 (e.g. by a processing specification generator 50; see below). FIG. 5 shows an exemplary processing specification 30 generated from the proposed window specification 20 'X in to X out' shown in the third row of FIG. 4, wherein it was selected (preferably be the user) that windows may overlap. More specifically, the second line in the processing specification 30 of FIG. 5 denotes the stream 10 specified by the user to collect a stream sample from. The keyword 'sliding' in line 4 defines that windows may overlap (otherwise, the keyword 'tumbling' may be used). Lines 6-7 define the start condition for the window(s), namely that a 'direction' attribute of the respective event must have a value 'in'. Lines 8-14 define that a window ends with an event having a 'direction' attribute with value 'out' (cf. lines 9-10) and if the event has a 'name' attribute whose value equals the value of the 'name' attribute of the corresponding start event.

Additionally or alternatively, the generated syntax 30 could be passed to a query building tool that allows for a graphical specification of the event processing.

In some embodiments, the present invention can be used to visualize the window definition 20 underlying a given XQuery and to propose window refinements based on a similarity analysis based on the window definition 20 (i.e. analyzing whether in the given window, relevant similarities show up that might suggest different window definitions). This aspect represents an important extension to the present invention. Accordingly, the method would start with a given XQuery (or a processing specification 30 in any other format, preferably received and/or selected by the user). Rather than the user selecting a stream, the stream would be derived from the XQuery. Moreover, the XQuery would be evaluated on the stream sample to show the windows rather than window computation based on similarity (as already described above). In summary, this aspect serves for visualizing of XQuery window definitions. The user may then either manipulate the given XQuery and have the results displayed, or he may choose to be presented with refined window specifications (e.g. via elements of a suitable graphical user interface), which may then use the window definition(s) already defined in XQuery as a basis for further and/or similar similarities. This way, the present invention may be used if a running system (using existing processing specifications 30) is already present, but if the queries 30 are no longer appropriate, e.g. either because the requirements have changed or because the stream characteristics have changed over time.

In the following, example usages of similarity metrics are explained. For example, based on a selected start event 100a, . . . , 100n, the most similar subsequent event(s) 100a, . . . , 100n may be identified in the stream sample 10 as follows. The similarity metric may operate on the event attributes of pairs of events/data items, e.g. based on a rule system like the following:

add 1 to the similarity value for each attribute having the same value in both events.

if an attribute is a binary attribute (i.e. an attribute that can only have two distinct values), add 0.5 to the similarity value for each attribute having a complimentary value in the pair of events (cf. the attribute 'location' with the values 'in' and 'out' in FIG. 3).

It will be appreciated that the above rule system is only a very simple example for the sake of demonstration and that the present invention is capable of supporting arbitrary complex rule systems. In the following, the above rule system is applied to the exemplary stream 10 shown in FIG. 3 in order to calculate proposed window specifications 20:

Starting from the data item 100b in FIG. 3 (whose attribute 'person' has the value 'Bob' and whose attribute 'direction' has the value 'in'; in the following denoted as 'Bob in'), the next data item 100c within the stream 10 is 'Bob out'. Accordingly, the pair-wise similarity value of the pair of data items 100b and 100c according to the above rule system is 1.5 (since the 'person' attributes have the same value and the binary 'direction' attributes have complementary values). A correspondingly proposed window specification 20 with the start condition 'X in' and the end condition 'X out' is shown in the third row of FIG. 4. During the generation of the proposed window specification(s) 20, it is preferably assumed that all events/data items 100a, . . . , 100n are similar, i.e. they have the same type (in the example one 'person' attribute and one 'direction' attribute). Since in the example, the 'person' attributes of two similar events have the same value, the 'person' attribute is generalized to 'X' in the proposed window specification 20. Since the 'direction' attributes of two similar events have opposite values ('in' and 'out'), this information is also included into the proposed window specification 20. Determining that 'in' and 'out' are complementary attribute values may be achieved by inspecting the value range of the corresponding attribute, which in this case may turn out to comprise only a set of two elements, and treat these as binary attribute values.

Furthermore, the pair-wise similarity value of the pair of data items 100b ('Bob in') and 100d ('Bob in') is 2.0 (since both the 'person' attributes and the 'direction' attributes have the same values). Accordingly, a proposed window specification 20 with the start condition 'X in' and the end condition 'X in' is generated, as shown in the last row of FIG. 4.

Moreover, the pair-wise similarity value of the pair of data items 100b ('Bob in') and 100e ('Carie in') is 1.0 and the pair-wise similarity value of the pair of data items 100b ('Bob in') and 100*f* ('Ann out') is 0.5. The corresponding window specifications 'X in to Y in' and 'X in to Y out', respectively, are not shown in FIG. 4, since in this example, only the top two proposed window specifications 20 are selected and presented to the user.

Furthermore, based on similarity metrics, the window patterns (i.e. equal values of specific attributes, etc.) with the highest accumulated similarity values may then be selected and presented to the user. The accumulated similarity value may be calculated e.g. by summing up all of the pair-wise similarity values of all the pairs of data items 100*a*, ..., 100*n* in the stream 10. For example, for the proposed window specification 20 'X in to X out', there are five corresponding windows in the sample stream 10 depicted in FIG. 3 (see the bold rectangles in FIG. 4), so that the accumulated similarity value would be 7.5 (=5·1.5). For 'X in to X in', there are four corresponding windows, leading to an accumulated similarity value of 8 (=4·2.0). A proposed window specification 20 of 'X in to Y in' would yield five windows with similarity 1.0 and thus an accumulated similarity value of 5 (=5·1.0). As a result the latter window specification 20 may be considered less relevant than the other two.

Accordingly, a proposed window specification 20 whose concrete windows appear more often within the stream 10 is assigned a higher accumulated similarity value than a proposed window specification 20 who only has e.g. one window (i.e. one concrete sub-sequence of events matching the window specification) within the stream 10.

Additionally or alternatively, metadata about the events/data items, their types and/or the values of their attributes may be included in the similarity metric. For example, an ontology may be employed that defines 'Ann' as a female name and 'Bob' as a male name in order to apply similarity metrics, or an ontology may be used to determine that the value 'in' is the contrary of 'out'.

In summary, the present invention is in some embodiments based on the concept of using samples of a stream of data items to propose window slicing (i.e. the proposed window specifications) and to interact with a user on the final window definition in order to generate the syntax (i.e. the processing specification 30) for the chosen window specification 20. This approach is advantageous over the prior art (e.g. manually writing a processing specification 30 in XQuery as in FIG. 1), since for a less technically oriented person, it is very difficult to define such processing specifications, which leads to wrong and error prone window definitions.

Figure 6:
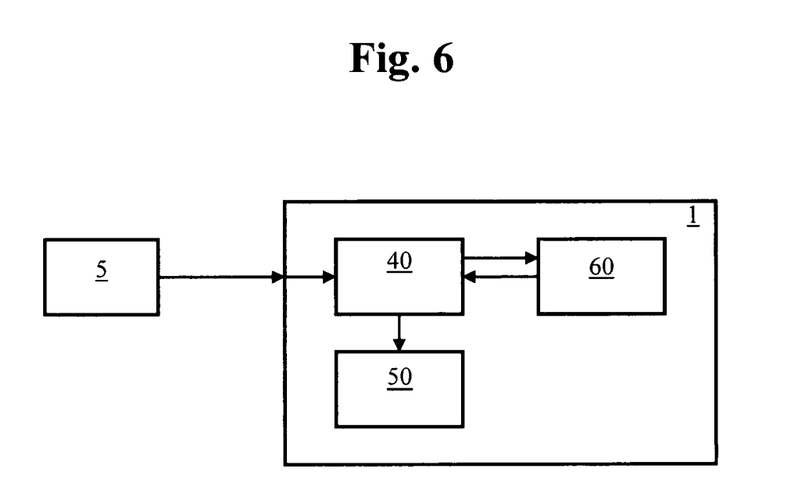
FIG. 6: A block diagram showing a system in accordance with an embodiment of the present invention.

FIG. 6 shows an exemplary system 1 in accordance with an embodiment of the present invention. As can be seen, the system 1 is in communication with the sensor 5 in order to obtain a captured event stream 10. The system further comprises a window specification generator 40 that is adapted for generating proposed window specifications 20, as well as a processing specification generator 50 that is adapted for generating the at least one processing specification 30 based on the to proposed window specifications 20. The system 1 further comprises in the embodiment depicted in FIG. 6 a graphical user interface 60 for displaying to a user the generated proposed window specifications 20. For example, the graphical user interface 60 may display the proposed window specifications 20 depicted in FIG. 4. Additionally the graphical user interface 60 may comprise graphical interaction elements (such as the check boxes and drop-down menus shown in FIG. 4) in order to enable the user to interact with the system 1 to fine-tune the processing specification generation, as described further above. The system 1 as well as its components may be further adapted for performing any of the further steps of the method described above. It will be appreciated that the system 1 shown in FIG. 6 is a central processing component. However, the system 1 may alternatively be implemented as a distributed system, e.g. by distributing the proposed window generator 40 and the processing specification generator 50 onto distinct computer systems that communicate with each other over a network connection.

The invention claimed is:

1. A method for generating at least one processing specification for a stream of data items captured by at least one sensor, the method comprising:
   receiving the stream of data items captured from the at least one sensor;
   processing, via at least one processor, a similarity metric on the stream of data items to identify similar pairs of data item within the stream;
   generating, via at least one processor, a plurality of proposed window specifications based on the stream of data items and the processed similarity metric, each one of the plurality of proposed window specification defined by a start condition and an end condition and encompassing at least some of the data items within the stream; and
   generating, via at least one processor, the at least one processing specification based on at least one of the plurality of proposed window specifications.

2. The method of claim 1, wherein the processing of the similarity metric includes calculating a pair-wise similarity value of at least one pair of data items in the stream of data items.

3. The method of claim 1, further comprising:
   calculating an accumulated similarity value for the plurality of proposed window specifications; and
   generating the at least one processing specification based on a proposed window specification of the plurality of proposed window specifications with the highest accumulated similarity value.

4. The method of claim 1, further comprising:
   outputting the plurality of proposed window specifications to a display so as to be viewable by a user;
   receiving user input from the user; and
   selecting at least one of the proposed window specifications based on the user input,
   wherein the at least one processing specification is based on the at least one selected proposed window specifications.

5. The method of claim 1, further comprising:
   selecting a first data item in the stream, the first data item associated with the start condition; and
   identifying a second data item in the stream based on the similarity metric.

6. The method of claim 5, further comprising:
   selecting a third data item in the stream that is different from the identified second data item; and
   generating a proposed window specification based on the pair of data items formed by the selected first and third data items.

7. The method of claim 1, wherein generating the at least one processing specification comprises generating processing instructions in a stream processing language, preferably XQuery.

8. The method of any of claim 1, wherein the data items comprise at least one attribute and wherein the processing of the similarity metric includes calculating a pair-wise similarity value based on values of the at least one attribute in the at least one pair of data items.

9. The method of claim 8, wherein the pair-wise similarity value is increased, if the values of the at least one attribute in the at least one pair of data items are equal.

10. The method of claim 8, wherein the pair-wise similarity value is increased, if the at least one attribute is a binary attribute and if the values of the at least one binary attribute in the at least one pair of data items are complementary.

11. The method of claim 1, further comprising:
receiving at least one processing specification; and
deriving at least one stream of data items based on the at least one processing specification and/or displaying at least one proposed window specification in the stream of data items.

12. A non-transitory computer readable storage medium including instructions for use with a processing system that includes at least one processor, the instructions, when executed on the processing system, are configured to at least:
receive the stream of data items captured from at least one sensor;
identify similar pairs of data items in the stream of data items based on a similarity metric that is applied over the stream of data items;
generate a plurality of proposed window specifications based on the stream and the similarity metric, each one of the plurality of proposed window specifications defined by a start condition and an end condition and encompassing at least some of the data items within the stream; and
generate the at least one processing specification based on at least one of the plurality of proposed window specifications.

13. A system for generating at least one processing specification for a stream of data items captured by a sensor, the system comprising:
a processing system that includes at least one processing system configured to at least:
receive the stream of data items captured from the sensor;
identify similar pairs of data items in the stream of data items based on a similarity metric;
generate a plurality of proposed window specifications based on the stream and the identified similar pairs of data items, each one of the plurality of proposed window specifications defined by a start condition and an end condition and encompassing at least some of the data items within the stream; and
construct the at least one processing specification based on at least one of the plurality of proposed window specifications.

14. The system of claim 1, wherein the processing system is further configured to:
calculate an accumulated similarity value for the plurality of proposed window specifications; and
generate the at least one processing specification based on the proposed window specifications with the highest accumulated similarity values.

15. The system of claim 13, wherein the processing system is further configured to:
output a graphical user interface that is adapted for displaying the plurality of proposed window specifications to a user;
receive user input of a selection of at least one of the proposed window specifications; and
generate the at least one processing specification based on the at least one selected proposed window specifications.

16. The method of claim 1, wherein the start condition and the end condition of each one of the plurality of proposed window specifications are based on at least one identified pair of similar data items.

17. The method of claim 1, wherein the plurality of proposed window specifications are generated independently of a process specification.

18. The medium of claim 12, wherein the plurality of proposed window specifications are generated independent of a process specification.

19. The system of claim 13, wherein the plurality of proposed window specifications are generated independently of a process specification.

* * * * *